US008842764B2

(12) United States Patent
Werner et al.

(10) Patent No.: US 8,842,764 B2
(45) Date of Patent: Sep. 23, 2014

(54) PRECODER WEIGHT SELECTION FOR MIMO COMMUNICATIONS WHEN MULTIPLICATIVE NOISE LIMITED

(71) Applicants: Karl Werner, Segeltorp (SE); Henrik Asplund, Stockholm (SE); Mikael Coldrey, Landvetter (SE); Jonas Medbo, Uppsala (SE); Andreas Nilsson, Göteborg (SE); Mathias Riback, Täby (SE)

(72) Inventors: Karl Werner, Segeltorp (SE); Henrik Asplund, Stockholm (SE); Mikael Coldrey, Landvetter (SE); Jonas Medbo, Uppsala (SE); Andreas Nilsson, Göteborg (SE); Mathias Riback, Täby (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 33 days.

(21) Appl. No.: 13/714,682

(22) Filed: Dec. 14, 2012

(65) Prior Publication Data
US 2014/0169415 A1    Jun. 19, 2014

(51) Int. Cl.
H04B 7/02        (2006.01)
H04B 7/04        (2006.01)
H04B 7/06        (2006.01)
H04B 15/00       (2006.01)

(52) U.S. Cl.
CPC .............. *H04B 15/00* (2013.01); *H04B 7/0413* (2013.01); *H04B 7/0615* (2013.01); *H04B 7/0456* (2013.01)
USPC ........... 375/267; 375/220; 375/299; 375/347; 455/101; 455/132; 455/500; 455/562.1; 370/464

(58) Field of Classification Search
CPC ...... H04B 7/024; H04B 7/066; H04B 7/0417; H04B 7/0469; H04B 7/0478; H04B 7/0626; H04B 7/0632; H04B 7/0413; H04B 7/0456; H04B 7/0615; H04B 15/00; H04L 1/003; H04L 1/0606; H04L 1/0026; H04L 1/0009; H04L 1/0041; H04L 1/0068; H04L 1/0625; H04L 1/0025; H04L 1/0643; H04L 1/0015; H04L 5/0023; H04L 5/0026; H04L 5/0044; H04L 5/0048; H04L 27/156; H04L 27/2608; H04L 27/2626
USPC .......... 375/220, 267, 299, 347; 455/101, 132, 455/500, 562.1; 370/464
See application file for complete search history.

(56) References Cited

U.S. PATENT DOCUMENTS

| | | | |
|---|---|---|---|
| 7,505,529 B2 * | 3/2009 | Kwak et al. | 375/295 |
| 7,729,232 B2 * | 6/2010 | Wang et al. | 370/203 |
| 8,094,744 B1 | 1/2012 | Song et al. | |
| 8,446,318 B2 | 5/2013 | Ali et al. | |
| 8,588,324 B2 * | 11/2013 | Mondal et al. | 375/267 |
| 2005/0088358 A1 | 4/2005 | Larry et al. | |

(Continued)

OTHER PUBLICATIONS

Yoo, T. et al. "Multi-Antenna Downlink Channels with Limited Feedback and User Selection." IEEE Journal on Selected Areas in Communications, vol. 25, No. 7, Sep. 2007, pp. 1478-1491.

(Continued)

*Primary Examiner* — Leon Flores
(74) *Attorney, Agent, or Firm* — Coats & Bennett, P.L.L.C.

(57) ABSTRACT

The method and apparatus disclosed herein improve throughput conditions limited by multiplicative noise by determining precoder weights for each data stream communicated between a MIMO transmitter node and a MIMO receiver node. The precoder weights are determined based on information derived from non-precoded reference symbols to decrease the energy allocated to the dominant signal path relative to the energy allocated to the non-dominant signal paths.

35 Claims, 11 Drawing Sheets

(56) References Cited

U.S. PATENT DOCUMENTS

| | | |
|---|---|---|
| 2007/0115180 A1 | 5/2007 | Kish et al. |
| 2009/0086648 A1 | 4/2009 | Xu et al. |
| 2009/0186658 A1 | 7/2009 | Jiang et al. |
| 2010/0002801 A1 | 1/2010 | Jia et al. |
| 2010/0291865 A1 | 11/2010 | Gore et al. |
| 2011/0051834 A1 | 3/2011 | Lee et al. |
| 2012/0120997 A1 | 5/2012 | Park et al. |
| 2012/0157001 A1 | 6/2012 | Chiu et al. |
| 2014/0029509 A1 | 1/2014 | Murakami et al. |

OTHER PUBLICATIONS

Grant, S. et al. "Performance Enhancement Through Joint Detection of Cochannel Signals Using Diversity Arrays." IEEE Transactions on Communications, vol. 46, No. 8, Aug. 1998, pp. 1038-1049.

Baum, D. et al., "Impact of Phase Noise on MIMO Channel Measurement Accuracy", IEEE 60th Vehicular Technology Conference, Sep. 26, 2004, pp. 1614-1618, vol. 3, IEEE.

Lozano, A. et al., "Mercury/Waterfilling: Optimum Power Allocation with Arbitrary Input Constellations", International Symposium on Information Theory, Proceedings, Sep. 4, 2005, pp. 1773-1777, IEEE.

* cited by examiner

PRECODER WEIGHT SELECTION FOR MIMO COMMUNICATIONS WHEN MULTIPLICATIVE NOISE LIMITED

BACKGROUND

Multiple Input Multiple Output (MIMO) communication is becoming an integral part of current and future wireless communication standards. Using multiple transmit and receive antennas, MIMO communications enable multiple data streams to be conveyed simultaneously and independently between the transmitter and the receiver without consuming additional bandwidth or other radio resources. To that end, the transmitter and/or receiver comprise an antenna array having multiple antennas, each associated with a variable antenna weight, where the antenna weights at the transmitter are generally referred to as precoders. Through the use of the weighted transmitter and/or receiver antennas, different patterns may be formed for different data streams. If the wireless radio channel exhibits rich scattering, e.g., low correlation or a small singular value spread, then multiple possible propagation paths exist between the transmitter and receiver, allowing different data streams to be transmitted by orthogonal mapping over the different paths.

The receiver must process the received composite signal to separate and decode each of the transmitted data streams. To that end, conventional systems use linear receivers, e.g., minimum mean square error (MMSE) receivers, or non-linear receivers, e.g., maximum likelihood (ML) receivers. The ability of either type of receiver to separate the transmitted data streams present in a received composite signal depends on the orthogonality between the channels of the individual data streams. In general, the separation will not be perfect, leading to inter-stream interference, which limits the achievable signal-to-noise ratio (SNR) or signal-to-interference plus noise ratio (SINR) for each signal stream. The more the data stream channels resemble each other, the more difficult it will be for the receiver to separate the data streams. Channel similarity may be expressed based on the cross-correlation of the channels, through an alternative measure known as the singular value spread (which is derived based on the channel). A large singular value spread indicates highly similar channels, and thus, a difficult receiver problem. Therefore, the best conditions for MIMO communications occur when the SNR or SINR is high and the wireless channel experiences rich scattering, as indicated by low correlation or a small singular value spread.

Unfortunately, to some extent the beneficial channel conditions for MIMO are mutually exclusive, meaning the highest SNR or SINR conditions often occur at the same time as the lowest experienced channel richness, and vice versa. This problem may be exacerbated when one or more dominant data streams overpower weaker multi-path data streams. As used herein, a dominant data stream or a dominant signal path is defined as the data stream or path associated with a dominant mode, a dominant eigenmode, and/or a line-of-sight (LOS) path. For example, a large singular value spread or a large amplitude difference between the data streams in the received composite signal (e.g., due to a dominant LOS data stream) may cause some of the weaker data streams to end up with low SNRs. In response, the receiver may try to optimize the throughput by requesting a lower rank transmission (i.e., to reduce the number of data streams) to avoid wasting power on data streams where little to no throughput is expected, and by requesting a power increase for the data streams where the SNR gain will translate into improved throughput.

Requesting a power increase, however, can exacerbate noise conditions proportional to or dependent on the signal strength, i.e., multiplicative noise, particularly when such noise conditions limit the throughput conditions. Further, the use of fewer data streams leads to lower peak data rates over the wireless connection, which is expected to become even more problematic as standards and technology trend towards transmitters and receivers capable of handling larger numbers of signal streams. For example, both LTE release 10 and IEEE 802.11ac have recently standardized up to 8×8 MIMO transmissions. Thus, there remains a need for improving MIMO throughput conditions limited by multiplicative noise.

SUMMARY

The method and apparatus disclosed herein improve throughput conditions limited by multiplicative noise by determining precoder weights for each data stream based on information derived from non-precoded reference symbols to decrease the energy allocated to the dominant signal path relative to the energy allocated to the non-dominant signal paths. Examples of the derived information include, but are not limited to, channel estimates, Rank Indicator (RI), a precoding matrix indicator (PMI), and a Channel Quality Indicator (COI). As used herein, the term multiplicative noise refers to any noise dependent on or proportional to a signal strength at a transmitting node and/or a receiving node in a wireless communication network. Also as used herein, a dominant signal path comprises any path associated with a data stream that overpowers other data streams, and includes but is not limited to a path (or data stream) associated with a dominant mode, a dominant eigenmode, and/or a LOS signal path. In addition, as used herein, the term "precoded reference symbols" refers to reference symbols weighted by weights derived from channel information, and the term "non-precoded reference symbols" refers to reference symbols that are not weighted by weights derived from channel information.

An exemplary method comprises determining that multiplicative noise limits the throughput conditions, where the multiplicative noise comprises any noise dependent on or proportional to a signal strength at at least one of the MIMO transmitter and the MIMO receiver. The method further comprises determining a set of precoder weights for each of one or more data streams communicated between the MIMO transmitter and the MIMO receiver based on information derived from non-precoded feedback reference symbols to decrease the transmission power allocated to one or more of the data streams associated with a dominant signal path relative to the transmission power allocated to one or more of the data streams associated with a weak signal path.

An exemplary MIMO transmission node comprises a noise processor and a weight unit. The noise processor is configured to determine that multiplicative noise limits the throughput conditions, where the multiplicative noise comprises any noise dependent on or proportional to a signal strength at at least one of the MIMO node and a remote MIMO node. The weight unit is configured to determine a set of precoder weights for each of one or more data streams communicated between the MIMO node and the remote MIMO node based on information derived from non-precoded feedback reference symbols. The precoder weights are determined to decrease the transmission power allocated to one or more of the data streams associated with a dominant signal path relative to the transmission power allocated to one or more of the data streams associated with a weak signal path.

DETAILED DESCRIPTION

The methods and apparatuses disclosed herein improve the achievable MIMO throughput in conditions where the MIMO throughput is limited by multiplicative noise, e.g., phase noise or quantization errors in the equipment, rather than by additive noise, e.g., thermal noise or interference. As used herein, the term multiplicative noise refers to any noise dependent on or proportional to a signal strength at a transmitting node and/or a receiving node in a wireless communication network. To that end, precoder weights are determined for each data stream communicated between MIMO devices. The precoder weight determination is based on information derived from non-precoded feedback reference symbols to decrease the transmission power allocated to one or more of the data streams associated with a dominant signal path relative to the transmission power allocated to one or more of the data streams associated with a weak signal path. In a preferred embodiment, the determined precoder weights are applied in the digital domain before any IFFT operations. Further, some embodiments implement the disclosed precoder selection as part of transmit mode 9 (TM9) in 3GPP LTE rel. 10 and do not require changes to this standard. It will be appreciated, however, that the claimed precoder selection technique may be used with other standards applicable to MIMO transmissions based on UE-specific reference symbols.

The following describes the invention in terms of a line of sight (LOS) signal path. It will be appreciated, however, that the present invention is applicable for MIMO conditions having any type of dominant signal path, including but not limited to a path or data stream associated with a dominant mode, a dominant eigenmode, and/or a LOS signal path. Before discussing this further, the following first provides details regarding MIMO communication systems and the associated problems.

Figure 1:
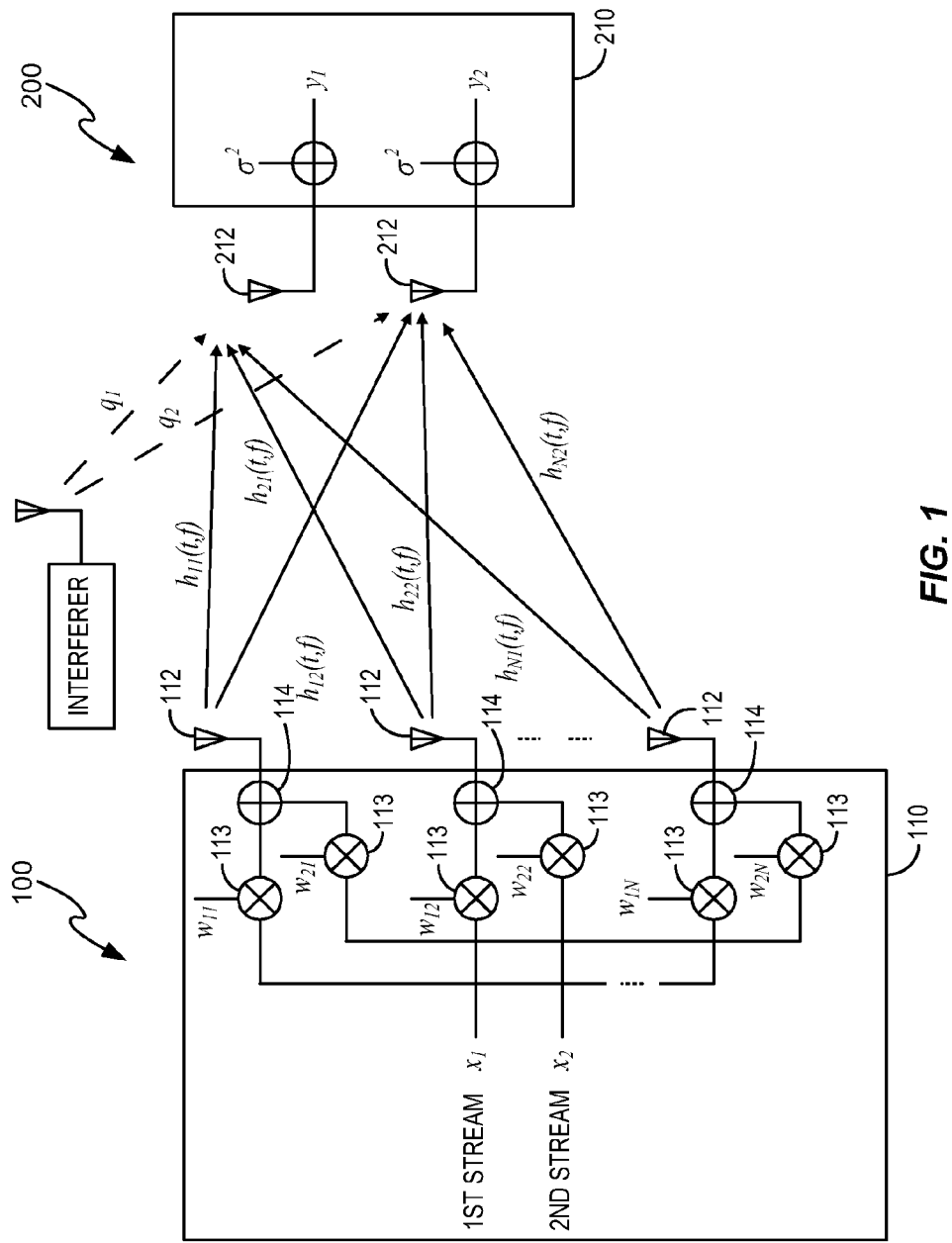
FIG. 1 shows a block diagram of an exemplary MIMO communication system.

FIG. 1 shows a block diagram of a MIMO communication system comprising two MIMO communication nodes, e.g., a transmitter node 100 and a receiver node 200. It will be appreciated that each MIMO communication node 100, 200 may comprise any one of a pico site, a radio base station (including a NodeB and an eNodeB), an access point, a relay, a wireless backhaul node, a user equipment or other wireless device, or any node within the wireless network capable of transmitting and receiving signals. Each MIMO communication node 100, 200 comprises an antenna array 110, 210 having multiple antennas 112, 212. Each of the N antennas 112 of the transmitter node 100 are associated a multiplier 113 and a combiner 114. Each multiplier 113 applies a weight (precoder) to one of the B input data streams $x_b$, and the combiner 114 combines the weighted data streams to generate a composite signal for transmission from the corresponding antenna 112. In the example of FIG. 1, B=2 for simplicity. It will be appreciated, however, that any number of data streams up to B=N may be used.

More particularly, multipliers 113 apply a first column vector of weights $w_1 = [w_{11}; w_{12}; w_{13}; \ldots; w_{1N}]$, which may be frequency dependent, to a first data stream $x_1$ for transmission from antenna array 110. Different combinations of weights correspond to different radiation patterns through the antenna array response $a(\theta,\phi) = [a_1; a_2; a_3; \ldots; a_N]$, where:

$$a_n(\theta,\phi) = g_n(\theta,\phi) e^{ik \cdot r_n}. \tag{1}$$

In Equation (1), k represents the wave vector $2\pi/\lambda n$ where n represents a unit vector in the direction $(\theta,\phi)$, $r_n$ represents the antenna displacement vector, and $g_n(\theta,\phi)$ represents the per-element antenna gain vector. While $g_n(\theta,\phi)$ is shown here as a scalar, it will be appreciated that $g_n(\theta,\phi)$ may be generalized to polarized antennas and channels. The shape $G_1(\theta,\phi)$ of the radiation pattern used to transmit data stream $x_1$ becomes:

$$G_1(\theta,\phi) = w_1^T a(\theta,\phi). \tag{2}$$

A second data stream $x_2$ may be transmitted using the same antenna array 110 using the weights $w_2 = [w_{21}, w_{22}, w_{23}, \ldots, w_{2N}]$. In general, up to N data streams can be transmitted simultaneously. The total transmitted signal may be represented by the superposition:

$$Wx = w_1 x_1 + w_2 x_2. \tag{3}$$

The application of weights W ($w_1, w_2$) at the transmitter node 100 is generally referred to as pre-coding.

The receiver node 200 also comprises an antenna array 210 of M antennas 212, where the radio channel between the $n^{th}$ transmitting antenna 112 and the $m^{th}$ receiving antenna 212 may be expressed as $h_{nm}$, where $h_{nm}$ may be time-dependent and/or frequency-dependent. While not shown, the receiver node 200 may also apply different weight vectors to the antenna array 210 for different received signals. In matrix notation, the received signal $y = [y_1, y_2, y_3, \ldots, y_M]$ may be expressed as:

$$y = (I + \Sigma_{rx}) H (I + \Sigma_{tx}) Wx + \Sigma + Q, \tag{4}$$

where the diagonal matrixes $\Sigma_{rx}$ and $\Sigma_{tx}$ represent multiplicative noise, including but not limited to phase noise and quantization errors, H represents a matrix of the channel estimates, $\Sigma$ represents additive noise, including but not limited to thermal noise, and Q represents the interference.

The receiver node 200 is thus tasked with the problem of separating the received composite signal y into the individual data streams $x_1, x_2, \ldots, x_N$ in order to successfully decode each data stream. This problem is generally complex, but it has been shown that in the absence of interference, phase noise, and dynamic range limitations, the optimal precoders and receive weight vectors are given by the singular value decomposition (SVD) of the wireless channel. In particular, it has been shown that the receive weight vectors under these conditions may be given by $H = U \cdot S \cdot V$, where U represents the unitary pre-coding matrix, V represents the unitary receiver weight matrix, and S represents a diagonal matrix where each diagonal element represents the signal amplitude that a particular mode of communication will experience. Thus, for an M×N channel H, the diagonal matrix S will be of size M×N. In other words, the number of independent channels that can be transmitted over this channel is bound by min(M, N). If the channel H is rank-deficient, then some of the elements of S will be zero, further limiting the available number of data streams. In a noise-limited scenario, the total capacity R of the channel is known to be the sum of the Shannon capacity for each sub-stream, assuming equal and independent noise level $\sigma^2$ over the different receiver radio chains, as given by:

$$R = f_{BW} \sum_{n=1}^{N} \log_2\left(1 + \frac{p_n s_n^2}{\sigma^2}\right), \quad (5)$$

where $p_n$ represents the power allocated to the $n^{th}$ data stream and $f_{BW}$ represents the bandwidth.

In general, finding and utilizing the SVD requires full channel knowledge at the transmitter node 100, something which is costly to obtain in practical circumstances. In particular, full feedback of all channel coefficients $h_{nm}$ may require a prohibitive amount of reverse link capacity, especially when $h_{nm}$ is time- or frequency variant and the numbers N and/or M are large. Therefore, different lower-complexity schemes have been devised. One such scheme relies on quantized feedback of preferred precoders based on a previously agreed codebook, known as closed-loop pre-coding. Closed-loop pre-coding is a part of standards including but not limited to 3GPP UMTS and 3GPP LTE. The closed-loop codebook consists of a finite number of available pre-coding matrixes W for each rank (e.g., for each number of data streams to be transmitted). The receiver node 210 estimates the channel H, typically using reference symbols or pilots transmitted from each of the transmit antennas 112, as well as the noise and interference level, using any known technique. Next, the receiver node 200 evaluates all possible pre-coding matrixes and searches for the one that will result in the best utilization of the available radio resources, which is typically the rank and precoder that results in the highest data rate throughput given the estimated SNR or SINR. Once this is found, the receiver node 200 signals the desired rank and precoder on the reverse link to the transmitter node 100 to indicate the receiver node's preference, typically using a Rank Indicator (RI) and a pre-coding matrix indicator (PMI). In addition, the receiver node 200 may signal back the perceived channel quality using a Channel Quality Indicator (CQI) that it expects to experience with the selected precoder, to allow the transmitter node 100 to adjust the coding and modulation scheme optimally, a process known as link adaptation. The transmitter node 100 may, in some cases, be required to use the preferred pre-coding indicated by the receiver node 200. In other cases, the transmitter node 100 may override the recommendation at its discretion, e.g., due to circumstances unknown to the receiver node 200, e.g., the existence of additional receivers, scheduling priorities, non-full data buffers, etc. While possible, such an override may obsolete the CQI feedback because was generated based on the receiver's preferred precoder, which typically renders link adaptation more challenging.

Another MIMO scheme included in the same wireless communication standards is the so-called open-loop pre-coding. In this scheme, no channel or preferred precoder information is fed back to the transmitter node 100, although CQI and rank feedback are still used. Instead the transmitter node 100 will typically send information with a fixed precoder or a precoder that cyclically varies in time and/or frequency. Additionally, when multiple data streams are transmitted, the precoders are usually mixed in order to provide the same channel quality for all data streams. Open-loop pre-coding is subop-timal compared to closed-loop pre-coding. At high signal to noise ratios, however, the difference between the two diminishes. In particular, the closed-loop scheme will essentially find good precoders that result in good data stream separation and high per-stream SNRs at the receiver node 200, while the open-loop scheme instead relies on a high likelihood of using sufficiently good precoders and the ability of the receiver node 200 to separate the streams. The closed-loop scheme is sensitive to noisy channel estimates, which might result in non-optimal precoders. Also the reported precoder might be outdated by the time the transmitter node 100 uses it for the actual transmission. The open-loop scheme, on the other hand, relies on diversity and uses a wide range of different precoders. Thus, the open-loop scheme will not be optimal, but it is less sensitive to noise and timing issues. Regardless of whether the system uses a closed-loop or open-loop pre-coding scheme, the receiver node 200 processes the received composite signal to decode each of the data streams. Because the channel will typically mix the data streams, as is evident from Equation (4), signal processing is required to separate the data streams. Many different MIMO receiver structures are known in the art. Broadly, these fall in to two categories: linear receivers and non-linear receivers. The operation of a linear receiver may be expressed by a linear operator operating on the received signal vector y according to $\hat{x}=Wy$, where W represents the receiver weight matrix. An example of a linear receiver is the minimum mean square error (MMSE) receiver, which selects weights W such that the mean square error between the transmitted and the estimated symbols is minimized in the presence of additive noise and interference. The MMSE receiver is equivalent to a zero-forcing receiver in the case where no noise or interference exists. The operation of a non-linear receiver relies on the use of more complex operations, e.g., multi-stage operations. An example of a non-linear receiver is the Maximum Likelihood (ML) receiver or the Successive Interference Cancellation (SIC) receiver.

The ability of receiver node 200 to separate the data streams depends on the orthogonality between the data stream channels. In general the separation will be non-perfect, leading to inter-stream interference which limits the achievable SINR for each stream. The more the data stream channels resemble each other, the more difficult the separation will be, leading to lower effective SINRs on each sub-stream. Channel similarity is often expressed by the cross correlation, though an alternative measure is the singular value spread. The cross correlation coefficient of two channel coefficients $h_1$ and $h_2$, for example, may be defined by:

$$\rho_{12} = \frac{E\{h_1 h_2^*\}}{\sqrt{E\{h_1 h_1^*\}E\{h_2 h_2^*\}}}, \quad (6)$$

and is typically estimated by the sample cross correlation:

$$r_{12} = \frac{\sum_{k=1}^{K} \tilde{h}_1(k)\tilde{h}_2^*(k)}{\sqrt{\sum_{k=1}^{K} \tilde{h}_1(k)\tilde{h}_1^*(k) \sum_{k=1}^{K} \tilde{h}_2(k)\tilde{h}_2^*(k)}}, \quad (7)$$

where $\tilde{h}_1(k)$ and $\tilde{h}_2(k)$ represent sequences of (typically noisy) channel estimates of the channels $h_1$ and $h_2$. The singular value spread is derived from the singular value matrix S (derived from the channel H). A simple measure of this spread is the ratio of the largest and the smallest singular value, e.g., $$\frac{s_{max}}{s_{min}}.$$

Large correlations between the elements of the channel matrix H implies a large singular value spread and hence a difficult receiver problem.

In the case that multiple streams are transmitted, the power per data stream will be lower than if fewer or a single data stream is transmitted. Successful link adaptation thus requires finding the optimal number of data streams to transmit, and also the power to use for each data stream. This optimum will be SNR-dependent. At low SNRs it is typically better to allocate all power to one data stream, while at higher SNRs the available transmit power may be equally shared across data streams while still maintaining a sufficiently high per-stream SNR to allow a high order of modulation and coding. It has been shown that an optimal per-stream power allocation, in the absence of interference, phase noise, and dynamic range limitations, is given by a "water filling" solution, in which power is allocated proportional to the per-data stream SNR, but only to those data streams that have an SNR exceeding a certain threshold. However existing cellular standards tend to share transmit power equally across the data streams. As seen in Equation (5), data streams with poor conditions (weak $s_n$) will not contribute as much to the total throughput as data streams with good conditions (strong $s_n$) due to the $\log_2$ expression. The best conditions for MIMO communications thus occur when the SNR or SINR is high and the wireless channel experiences rich scattering, e.g., low correlation or a small singular value spread.

In cellular communication systems, where multiple transmitters and receivers in different cells (or even the same cell) re-use the same radio resources, e.g., time slots and/or frequency bands, there will be interference between the transmissions. In addition, the further the receiver node 200 is from the transmitter node 100, and the more obstacles in between that block the direct radio path, the weaker the received signal will be. Thus, the signal levels tend to be highest when there is line of sight (LOS) path between the desired transmitter-receiver pair, and no LOS path for the interfering transmitters.

Figure 2:
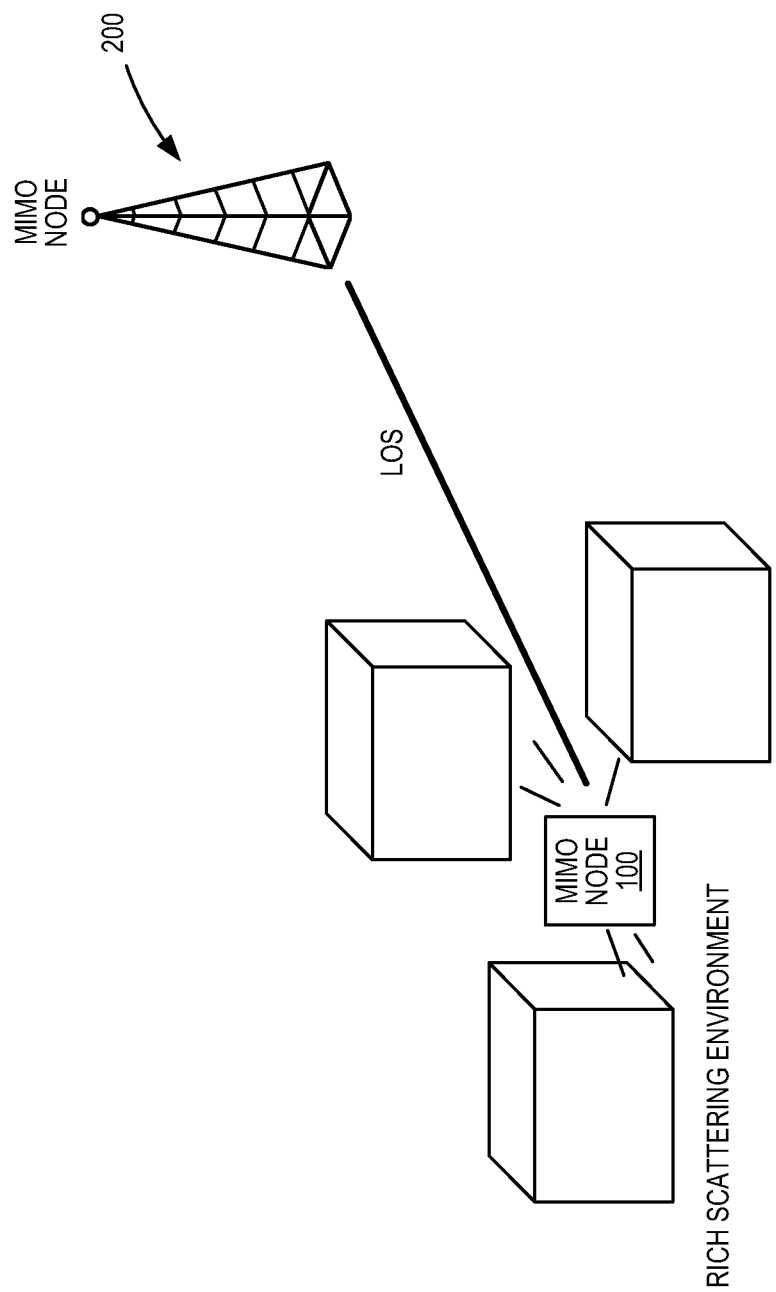
FIG. 2 shows an exemplary rich scattering environment.

However, the channel gain of the data stream utilizing the LOS path and the others differ substantially as the scattered paths are much weaker, as shown in FIG. 2. In order to utilize the scattered paths in combination with the strong LOS path, the receiver node 200 needs a very large dynamic range (on the order of 50-60 dB), which in most practical cases is not possible. The beneficial channel conditions for MIMO are thus to some extent mutually exclusive, because the highest SNR or SINR conditions occur at the same time as the lowest experienced channel richness, and vice versa. It is possible to utilize antenna polarization to maintain good sub-channel isolation even in the presence of a dominant LOS path signal, e.g. by transmitting and receiving streams with orthogonally polarized antennas. However, this ability is restricted to the two polarizations possible for a plane wave.

In addition, various transmitter and receiver impairments will further exacerbate the problems of channel richness and of inter-stream interference. For example, non-linearities in the transmitter node 100 may cause a power-dependent error floor of the transmitted symbols. This error is commonly characterized by the Error Vector Magnitude (EVM), which is defined as the error of a complex modulation symbol divided by the amplitude of that symbol. Typical sources of EVM include thermal and phase noise, the dynamic range of the Digital-to-Analog (D/A) converter, quantization errors in the digital representation of the transmitted signals, and saturation or clipping in the power amplifiers. Similarly, the receiver node 200 may also suffer from various impairments that can be characterized by a receiver EVM. The EVM in the transmitter node 100 and/or receiver node 200 may be reduced by using more expensive, high quality components and complex circuitry. However, the cost-benefit trade-off in commercial and mass-market communication equipment usually leads to EVM values of at best around 3% or −30 dB. As a result, the SNR that the receiver experiences on its channel estimates will be upper limited by ~30 dB. A large singular value spread or data stream amplitude spread will cause some of the weaker of the potential MIMO data streams to end up with low or negative (in dB) estimated SNRs. As the receiver node 200 tries to optimize the throughput it will most likely request a lower rank transmission to avoid wasting power on streams where little or no throughput is expected, and instead increase the power of the stronger data streams where the SNR gain will translate into a larger throughput gain. The fact that the channel estimates for the weaker data streams will be noisier also has consequences for the capabilities of the MIMO receiver node 200 to suppress the inter-stream interference, which further discourages the use of many streams.

Figure 3:
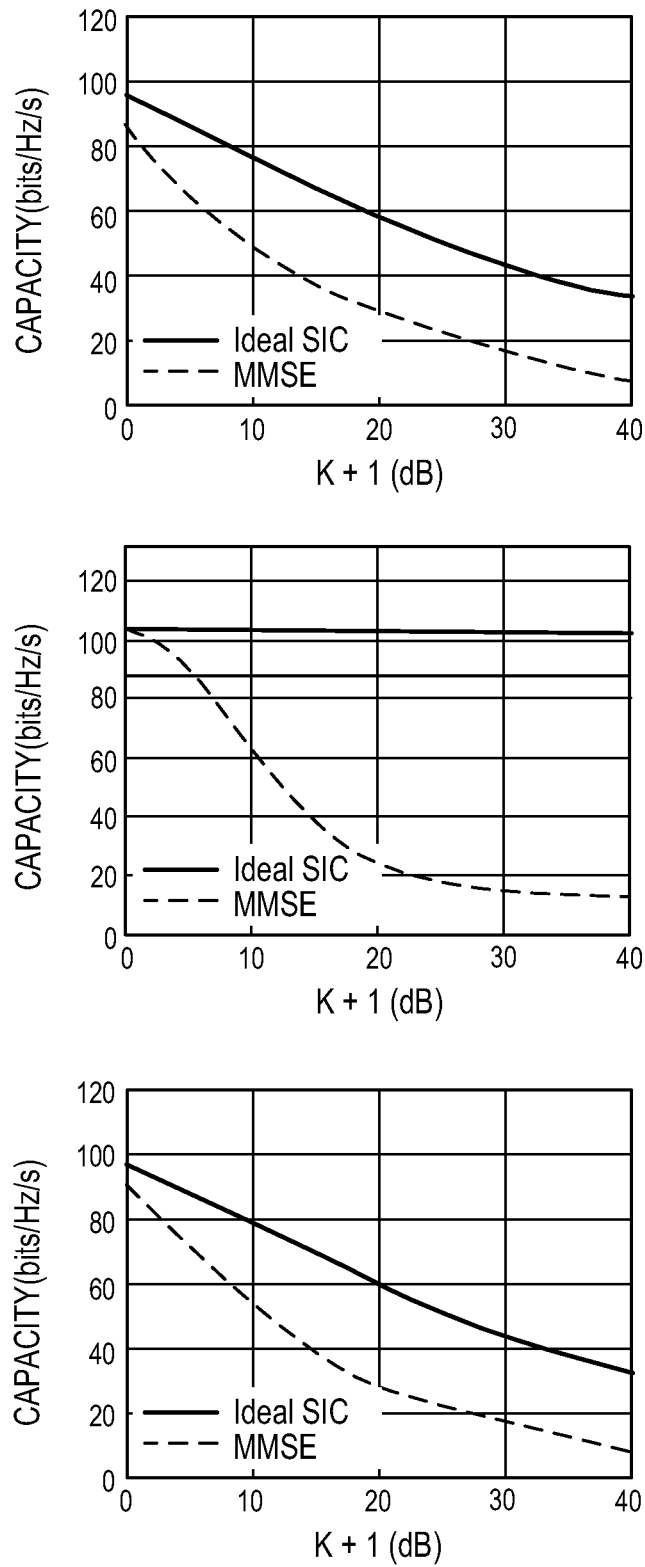
FIG. 3 shows the effect of multiplicative noise in a MIMO communication system.

FIG. 3 shows the effect of multiplicative noise (e.g., noise that depends on signal strength, e.g., phase noise) at the level of −30 dB when equal power is allocated to all data streams. FIG. 3A applies when only the receiver node 200 is multiplicative noise limited. FIG. 3B applies when only the transmitter node 100 is multiplicative noise limited. FIG. 3C applies when the transmitter node 100 and the receiver node 200 are equally multiplicative noise limited. A performance degradation of 50% or more will occur when the Ricean K value (i.e., the ratio of the power in the LOS path to the power in the non-LOS paths) is larger than 10 dB and 25 dB for an MMSE receiver and an ideal successive interference cancellation (SIC) receiver, respectively. This level of degradation is likely to occur in real networks that use higher order MIMO transmission schemes, as K values at the order of 10 dB or larger are likely due to LOS conditions. It should be noted that the additive noise in this case is well below the multiplicative noise, and thus the throughput is limited by the multiplicative nose. Moreover, for the case where the multiplicative noise occurs only in the transmitter node 100, no degradation is observed for an ideal SIC receiver.

The use of fewer MIMO data streams leads to lower peak data rates over the wireless connection, because the data rate per data stream is typically limited by the highest modulation and coding scheme for which equipment and standard is prepared for. This effect has been observed in deployed systems, typically in situations where there LOS conditions exist between the transmitter node 100 and receiver node 200. The degradation can be quite large; the throughput can drop by a factor of two or even three compared to non-LOS (NLOS) conditions. Examples include situations where the terminal passes into a LOS path at a street corner; thus, the effect can be very rapid. The problem increases the higher the number of transmit and receive antennas there are in the MIMO link. As both LTE release 10 and IEEE 802.11ac have recently standardized up to 8×8 MIMO configurations, the problem is expected to become even more evident as 8-antenna products become available.

Figure 4:
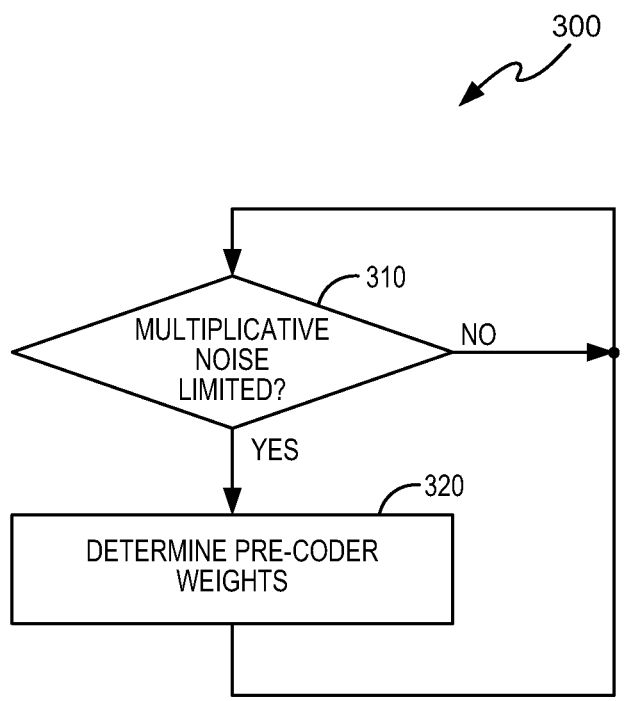
FIG. 4 shows a method for improving throughput conditions according to one exemplary embodiment.

FIG. 4 shows an exemplary method 300 that may be used to improve throughput conditions between a MIMO transmitter node 100 and a MIMO receiver node 200 when the MIMO throughput is limited by multiplicative noise. When it is determined that the throughput is limited by multiplicative noise (block 310), precoder weights for each data stream are determined based on information derived from non-precoded feedback reference symbols received at the receiver node 100 (block 320). The precoder weights are derived to decrease the transmission power of the LOS data streams relative to the transmission power of the non-LOS data streams, and therefore, to increase the quality and/or throughput of the MIMO channel. The derived information includes but is not limited to channel estimates, PMI, CQI, and RI. Determining the precoder weights in this manner limits the energy radiating in the LOS path(s), and therefore, decreases the singular value spread of the effective MIMO channel experienced by the MIMO receiver node 200. In other words, the precoder weight selection disclosed herein prevents the weak NLOS data streams from being hidden by the dominant LOS data streams. As a result, the transmitted data streams corresponding to the weaker signal paths avoid the impairments that would otherwise be caused by data streams associated with the dominant signal paths in a multiplicative noise limited scenario. If the antenna setup includes dual polarized antennas, the choice of PMI (and hence precoder weights) may be done independently for each polarization. In the following discussions, only one polarization is considered and all precoder weight vectors, matrices etc. are assumed to consist of precoder weights for the considered polarization only.

Figure 5:
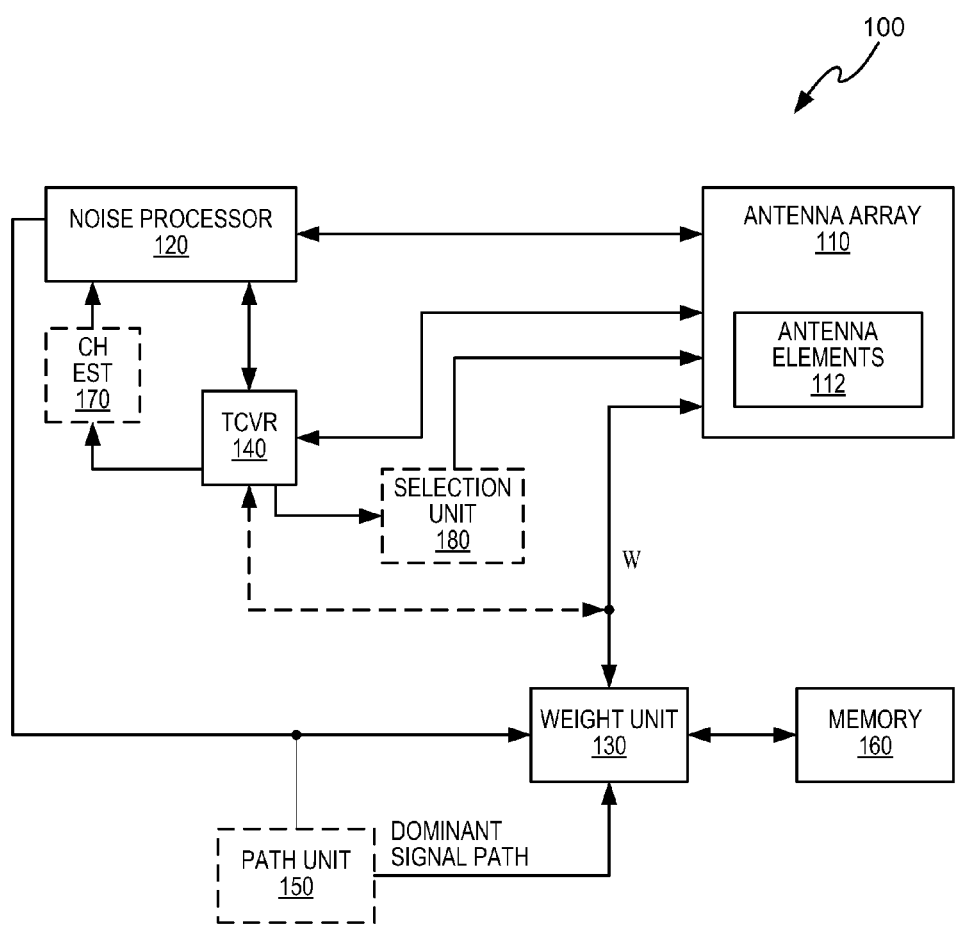
FIG. 5 shows a block diagram of an exemplary transmitter node in the MIMO communication system.

FIG. 5 shows an exemplary MIMO transmitter node 100 configured to implement the method of FIG. 4. In addition to the antenna array 110 shown in FIG. 1, MIMO transmitter node 100 comprises a noise processor 120, weight unit 130, a transceiver 140, an optional path unit 150, and memory 160. Noise processor 120 is configured to determine whether multiplicative noise limits the MIMO throughput conditions. Weight unit 130 is configured to determine the precoder weights W based on information derived from non-precoded feedback reference symbols received by the receiver node 200 to increase the quality and/or throughput of the MIMO channel. Memory 160 is configured to store any information useful for operation of the node 100.

The precoder weight determination disclosed herein relies on a particular set of reference signals, referred to herein as Channel State Information Reference Symbols (CSI-RS). The CSI-RSs differ from Demodulation Reference Symbols (DM-RS), which are precoded in the same way as the data streams, in that the CSI-RSs are transmitted (precoded or non-precoded) independent of the data streams. Further, while the receiver node 200 must treat the DM-RSs the same as it treats the precoded data streams, no such requirement exists for the CSI-RSs, which are included in the standard to enable the receiver node 200 to determine the PMI, RI, and/or CQI.

According to current standard protocols, a receiver node 200 derives a Precoding Matrix Indicator (PMI), a Rank Indicator (RI), and a Channel Quality Indicator (CQI) from non-precoded CSI-RSs received from the transmitter node 100, and reports the derived indicators to the transmitter node 100. Non-precoded CSI-RSs are not optimal for the actual radio channel when multiplicative noise limits the throughput conditions. As a result, under these conditions, the reported PMI generally focuses the transmitted energy in the direction of the LOS path, which ultimately makes the multiplicative noise limited scenario even worse. Thus, when multiplicative noise limits the throughput conditions, the transmitter node 100 overrides the reported PMI and uses precoder weights that refocus at least part of the transmitted energy in the non-LOS directions. In some exemplary embodiments, the transmitter node 100 selects the precoder weights based on reported information derived from the non-precoded CSI-RSs received at the receiver node 200. In other exemplary embodiments, the transmitter node 100 uses precoder weights selected by the receiver node 200 based on information derived from the received non-precoded CSI-RSs. In either case, there is an increased probability that using precoder weights determined in this manner enables the transmitter node 100 to transmit more data streams, which enables a more efficient and effective use of the current radio channel. It will be appreciated that because the transmitter node 100 overrides the reported PMI, the reported CQI and RI cannot be directly used for rank and MCS format selection. Thus, the various precoder weight selection embodiments disclosed herein also address this problem.

Figure 6:
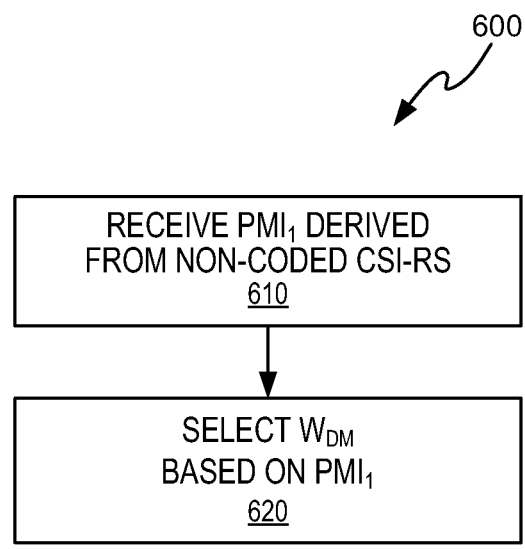
FIG. 6 shows a method for determining precoder weights according to one exemplary embodiment.

FIG. 6 shows a precoder selection method 600 according to one exemplary embodiment. The transceiver 140 receives a first PMI, CQI, and RI, all of which were derived at the receiver node 200 based on non-precoded CSI-RSs sent to the receiver node 200 by the transmitter node 100 (block 610). Weight unit 130 determines the precoder weights $W_{DM}$ for the data streams (and the corresponding DM-RSs) based on the first PMI (block 620). As noted above, the reported CQI and RI cannot be directly used for rank and MCS format selection. The transmitter node 100 may solve this problem, for example, based on a data decoding success indicator (e.g., ACK/NACK) received from the receiver node 200, as disclosed in "Method, Network Node and Computer Program for Determining Rank," filed 22 Dec. 2011 as PCT/SE2011/051573. Because the new precoder weights are expected to improve the likelihood of successful transmissions, the transmitter node 100 is configured to select a data rate greater than would otherwise be selected based on the reported CQI and RI. This process repeats until the multiplicative noise no longer limits the throughput conditions, or as long as the data rate of the data streams received at the receiver node 200 is higher than the data rate suggested by the CQI indicator derived from the non-precoded CSI-RSs.

Figure 7:
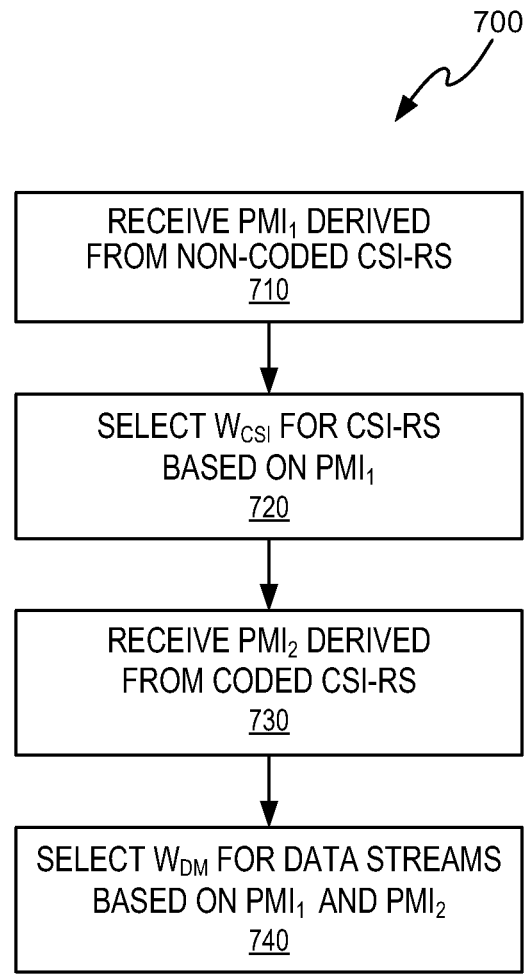
FIG. 7 shows a method for determining precoder weights according to another exemplary embodiment.

FIG. 7 shows a precoder selection method 700 according to another exemplary embodiment. The transceiver 140 at the transmitter node 100 receives a first PMI, CQI, and RI, all of which were derived at the receiver node 200 based on non-precoded CSI-RSs sent to the receiver node by the transmitter node 100 (block 710). Weight unit 130 determines the precoder weights for a subsequent set of CSI-RSs $W_{CSI}$ (block 720), which are used to pre-code the CSI-RS for a subsequent transmission, and which are transparent to the receiver node 200 in that the receiver node 200 does not have previous knowledge of the applied precoder weights. The transceiver 140 then receives a second PMI, CQI, and RI, all of which were derived at the receiver node 200 based on the precoded CSI-RSs sent to the receiver node 100 by the transmitter node 100 (block 730). Weight unit 130 determines the precoder weights for the data streams (and the corresponding DM-RSs) $W_{DM}$ based on the first and second PMIs (block 740), by selecting $W_{DM}$ based on the second PMI and $W_{CSI}$. Further, the transmitter node 100 may determine the transmission rank and transport format (e.g., code rate) based on the second PMI, CQI, and RI reported to the transmitter node 100. This process repeats until the multiplicative noise no longer limits the throughput conditions.

Both of the FIG. 6 and FIG. 7 embodiments rely on knowledge regarding the dominant signal path(s). Thus, the transmitter node 100 may include a path unit 150, as discussed further below, to determine the dominant path(s). It will be appreciated that when the receiver node 200 is configured to report the PMI only when the rank is one or two, the transmitter node 100 may identify the dominant path(s) as the path(s) corresponding to the reported PMI.

Figure 8:
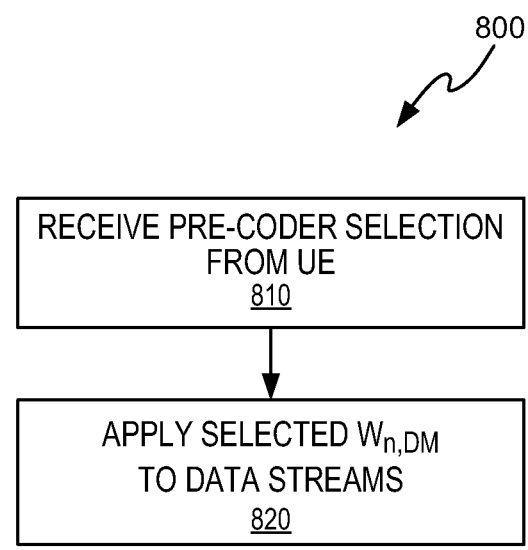
FIG. 8 shows a method for determining precoder weights according to another exemplary embodiment.

FIG. 8 shows a precoder selection method 800 according to another exemplary embodiment. In this embodiment, the receiver node 200 selects the precoder weights $W_{DM}$ for the data signals based on information derived from the non-precoded CSI-RSs, and conveys the selected weights to the transmitter node 100. The transceiver 140 at the transmitter node 100 receives the weights (block 810), and the weight unit 130 configures the multipliers 113 to apply the selected precoder weights to the data streams and the corresponding DM-RSs (block 820). While not required, the embodiment of FIG. 8 may be implemented such that the receiver node 200 selects the precoder weights from a standardized set of precoder weights, such as a precoder codebook, and conveys the selected weights using a weight indicator so as to accommodate the current LTE framework. As noted above, the receiver node 200 cannot directly determine the rank and MCS format selection based on the information derived from the non-precoded CSI-RSs. The receiver node 200 may address this problem, for example, based on a data decoding success indicator (e.g., ACK/NACK). Because the new precoder weights are expected to improve the likelihood of successful transmissions, the receiver node 200 is configured to report a CQI and/or RI associated with a greater data rate than would otherwise apply for the determined channel estimates. This process repeats until the multiplicative noise no longer limits the throughput conditions.

FIGS. 6-8 provide a general overview of three different embodiments. Each embodiment relies on determining precoders based on a PMI derived from non-precoded CSI-RSs. The following provides more specific details as to how such a determination may be made. It will be appreciated that the following details are for exemplary purposes only, and therefore, do not limit the scope of each embodiment.

Denote the reported PMI (computed by the receiver node 200 in multiplicative noise limited conditions based on non-precoded CSI-RSs) as $PMI_1$. Denote the desired rank of the determined precoder weights as $r_{des}$, and the reported rank (also computed in multiplicative noise limited conditions based on the non-precoded CSI-RSs) as $RI_1$. The precoder weights W may be determined using a lookup table or by direct calculation, where the determined weights are a function of $RI_1$, $r_{des}$, and $PMI_1$ according to:

$$W = f(RI_1, r_{des}, PMI_1), \quad (8)$$

where the desired rank $r_{des}$ should be chosen to be the best guess of the optimal rank for data transmission in the known conditions Entries for the look-up table may be predetermined. The methods outlined herein may be used for designing such a look-up table or for use during real-time computation in a network node, e.g., the transmitter node 100 and/or the receiver node 200.

Denote the standardized codebook precoder weights of rank r associated with a PMI by $W_s(PMI, r)$ and denote the $d^{th}$ ($1 \le d \le r$) column of $W_s$ by $w_d$. Then W may be chosen according to:

$$W = \underset{W \in S}{\operatorname{argmin}} \left( \sum_{d=1}^{RI_1} \sum_{j=1}^{r_{des}} |w_d^* \cdot W_j|^2 \right), \quad (9)$$

where $W_j$ represents the $j^{th}$ column of W and S represents the set of admissible precoder weights. It will be appreciated that in some embodiments, S may be a predefined codebook, e.g., the standardized codebook, or S may be a continuous range of matrices, e.g., all unitary matrices. It is possible to devise many similar criteria and the one above should only be considered an example. A basic principle is to select W such that the energy irradiated in the dominant (LOS) direction is reduced in relation to energy irradiated in other directions.

As an alternative, the singular value decomposition of $W_s$(PMI, r) may be used. In this case, let $$W_s(PMI,r)\Psi = U\Sigma V^* \quad (10)$$

represent the singular value decomposition of the (weighted) precoder matrix recommended by the receiver node 200 (e.g., for FIG. 8), where $\Psi$ represents a diagonal matrix where the diagonal elements may be one or may be set based on CQI. In principle, these diagonal elements may be set such that the steering vectors of the precoder weights corresponding to more dominant signal paths (LOS) are up weighted relative to other precoder weights. In certain cases, the reported CQI may indicate this. The non-zero diagonal values of the diagonal matrix $\Sigma$ may be represented by $\sigma_1 \ldots \sigma_{report1}$. Then W may be selected according to:

$$W = U\Sigma_{mod}, \text{where} \quad (11)$$

$$\sum_{mod} = \operatorname{diag}\left( \underbrace{(1-\alpha)\sigma_1 + \frac{\alpha}{1+\sigma_1}, \ldots, \alpha}_{RI_1}, \underbrace{\ldots, \alpha}_{r_{des}-RI_1}, 0, \ldots \right) \beta, \quad (12)$$

$\alpha$ (0 ... 1) represents a parameter controlling the balance of power between the modes of the channel parallel to the calculated PMI (LOS path) and the modes orthogonal to the calculated PMI, and $\beta$ represents a normalization factor. The selection of $\alpha$, which controls the extent to which dominant (LOS) data streams are suppressed, may be made in different ways, e.g., using a constant value (possible manually tuned);
using CQI reports (high CQI value should map to a high $\alpha$);
using measurements, e.g., uplink measurements; or
using Reference Signal Received Power (RSRP) measurements.

Equations (8)-(12) may also be used to determine the precoder weights $W_{CSI}$ used to precode the CSI-RSs in block 720 of FIG. 7. In this case, the desired rank $r_{des}$ should be chosen to be the highest rank that can be expected from the receiver node 200 in ideal conditions. Subsequently, the precoder weights $W_{DM}$ for the data streams may be selected in block 740 of FIG. 7 according to:

$$W_{DM} = W_{CSI} W_s(PMI_2, RI_2). \quad (13)$$

where $PMI_2$ and $RI_2$ respectively represent the PMI and RI derived from the precoded CSI-RSs and reported in the second phase. The rank and CQI may be determined according to the information derived from the precoded CSI-RSs in this second phase. It will be appreciated that $W_{DM}$ is used for the data streams and the DM-RSs.

When precoder weights for the data streams are selected using open-loop techniques, e.g., based on the PMI derived from non-precoded CSI-RSs as in FIGS. 6 and 8, the reported RI and CQI are no longer valid as the originally reported RI and CQI were computed under the assumption that the reported PMI was actually applied without modifications. Thus, the rank and MCS for such scenarios must be chosen based on other available measures. One way is to use ACK/

NACKs, where the desired rank used initially should preferably be determined to be higher than the originally reported rank $RI_1$. The MCS used in the initialization of the algorithm should be chosen so that the expected throughput is the same or slightly higher than the throughput expected using the original reported information. If the open loop algorithm suggests a CQI and RI combination that results in a lower throughput than the original estimates, it is assumed the multiplicative noise no longer limits the throughput, and the override procedure should end.

The techniques used to determine the PMI, and thus the precoder weights, at the receiver node 200 for subsequent reporting to the transmitter node 100 (FIG. 8) are similar to the techniques used to determine the precoder weights at the transmitter node 100 (FIGS. 6 and 7). However, in the transmitter methods an input from a finite alphabet (precoder weight from a codebook) is used to compute a precoder weight from a possibly infinite set. Here an estimate of the channel (where only the strongest data streams contains useful information) is mapped to a finite alphabet (the standardized codebook). More particularly, the SVD of estimated channel matrix H may be given by:

$$H = U\Sigma V^H, \tag{14}$$

where the matrix $\Sigma$ is diagonal. In multiplicative noise limited channel environments, some (typically one, or two in case of cross-polarized antennas) diagonal elements (the singular values) will dominate over the other. When $\hat{U}$ represents the matrix created from the columns of U corresponding to these dominating singular values, a possible choice of precoder weight may be given by:

$$W_{DM} = \underset{P \in codebook}{\operatorname{argmin}} \left\| \hat{U} \hat{U}^H W_{DM} \right\|_F^2. \tag{15}$$

The problem of determining if a singular value is dominating or not, and hence of determining how many columns of U to include, can be made by computing the ratio of the strongest singular value and each of the other singular values and then comparing to a threshold. The threshold should be set based on knowledge of the error vector magnitude of the receiver.

Figure 9:
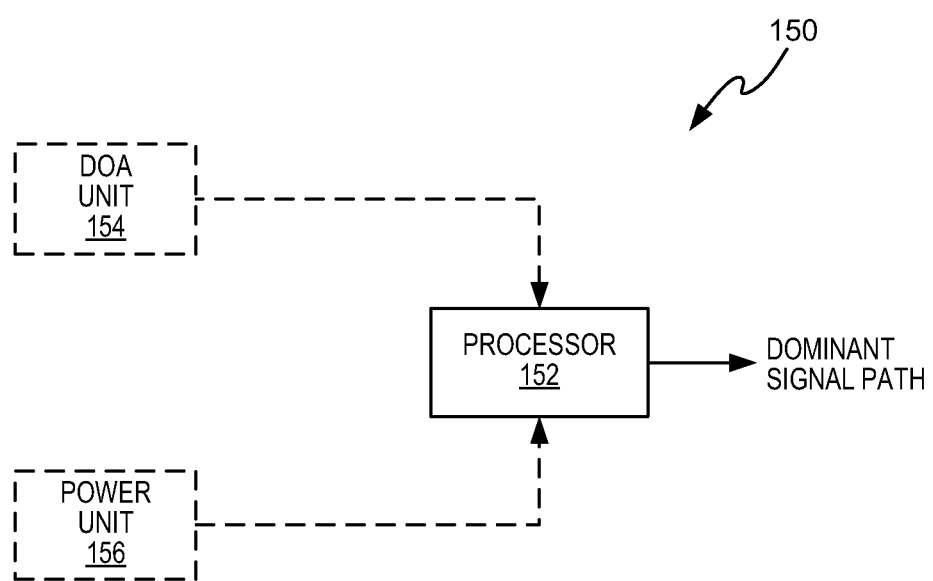
FIG. 9 shows a block diagram of a path unit according to one exemplary embodiment.

Referring again to FIG. 5, to facilitate the pre-code weight determinations, MIMO node 100 may further include a path unit 150 configured to identify the LOS path between the transmitter node 100 and the receiver node 200. In one exemplary embodiment, path unit 150 identifies the LOS path based on dominant signal path information received from a remote node, e.g., the receiver node 200 or another remote network node. In another embodiment, an exemplary path unit 150 comprises a processor 152 and an optional direction of arrival (DOA) unit 154, as shown in FIG. 9. DOA unit 154 is configured to estimate a DOA for each of two or more received signals received by transceiver 140 based on reference symbols included in the received signals. For example, the DOA may be determined in the digital domain by processing the received cell-specific reference symbols or channel state information reference symbols. Processor 152 is configured to identify the LOS path based on the estimated DOAs.

According to another exemplary embodiment, path unit 150 includes an optional power unit 156 and the processor 152, where the power unit 156 is configured to determine a power associated with each of the antennas 112, 212. The processor 152 is configured to identify the LOS path based on a relative comparison between the determined powers. For example, for wireless links having throughput conditions limited by multiplicative noise, it is of interest to know which of the B data streams or precoders gives the highest received power, because it is the power and multiplicative noise associated with this data stream that causes the degradation for the weaker data streams. In some situations, such as for an LOS link with co-polarized antennas, there might be a single dominating path corresponding to one dominant precoder and data stream. In other situations, there might be two or more dominant paths/data streams of similar power, e.g., in a LOS link with dual-polarized antennas.

The power unit 156 may determine the power per data stream according to:

$$P_j |H \cdot w_j|^2, \tag{16}$$

where $w_j$ represents the $j^{th}$ precoder vector of weights. This power may be determined for all possible precoder vectors, or for only those precoder vectors that correspond to the preferred or recommended precoder vectors (the number depending on the preferred or recommended rank). A MIMO node 100 with limited channel state information, e.g., the transmitter node 100 in an FDD system, may instead utilize PMI and CQI feedback to determine dominating precoders. In some cases, CQI values are coupled directly to corresponding precoders, while in other cases one CQI value is coupled to a codeword that is mapped to multiple data streams. The CQI value, which is indicative of the estimated SNR (or power), may therefore uniquely identify one precoder, or it may identify the sum of two or more precoders. Either case provides beneficial information. Finally, a MIMO node 100 with limited channel state information, e.g., a transmitter node 100 in an FDD system, may also utilize second order channel statistics measured on the reverse link to determine which direction or precoder weight will give the highest received power in the receiver node. Exemplary second order channel statistics include, e.g., antenna correlations or direction estimation via various methods as known in the art.

As discussed herein, the precoder weights are determined to decrease the energy in the dominant signal path(s) when multiplicative noise limits the throughput conditions, i.e., when the noise proportional to or dependent on the received (or transmitted) signal power experienced by the receiver node 200 on, e.g., its channel estimates, dominates. Thus, under such conditions, reducing the energy corresponding to the strongest signal paths (e.g., the strongest channel eigenvalues) while maintaining and/or increasing the energy corresponding to the weaker signal paths (e.g., weaker channel eigenvalues) effectively results in significantly reduced multiplicative noise in the weaker signal paths. The reduced multiplicative noise is due to the reduction of the cross-talk from the strongest signal paths, which in turn improves the per-data-stream SNR/SINR and subsequently the throughput over the wireless MIMO channel. If, on the other hand, the thermal noise and interference is stronger than the multiplicative noise then no such improvements are possible because any reduction in the transmitted signal power will only degrade the SNR or SINR levels for all data streams.

Because the precoder weight determination disclosed herein depends on the knowledge of whether multiplicative noise limits throughput conditions, it is also beneficial to provide methods and apparatuses to detect when multiplicative noise limits the throughput. Multiplicative noise $N_\pi$ limits the throughput conditions when:

$$\frac{1}{N_\pi} \le \frac{P_{sig}}{\sigma^2 + I}, \quad (17)$$

where $P_{sig}$ represents the signal power, $\sigma^2$ represents the thermal noise power, and $I$ represents the interference power. The multiplicative noise $N_\pi$ may be expressed as a combination of the multiplicative noise at the transmitter node 100 $\langle \Sigma_{tx}^2 \rangle$ and the multiplicative noise at the receiver node 200 $\langle \Sigma_{rx}^2 \rangle$ according to:

$$N_\pi = \langle \Sigma_{tx}^2 \rangle + \langle \Sigma_{rx}^2 \rangle. \quad (18)$$

The determination of whether multiplicative noise limits the throughput conditions may be made in the transmitter node 100, or in a network node remote from the transmitter node 100 that subsequently sends a quantitative or qualitative multiplicative noise evaluation to the transmitter node 100.

Figure 10:
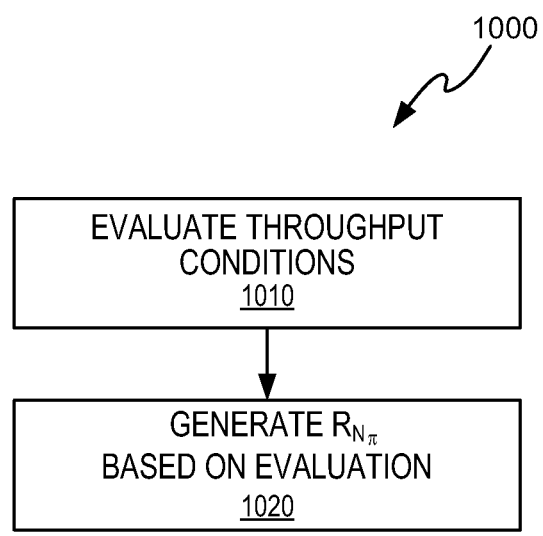
FIG. 10 shows a method of determining whether multiplicative noise limits throughput conditions according to an exemplary embodiment.
Figure 11:
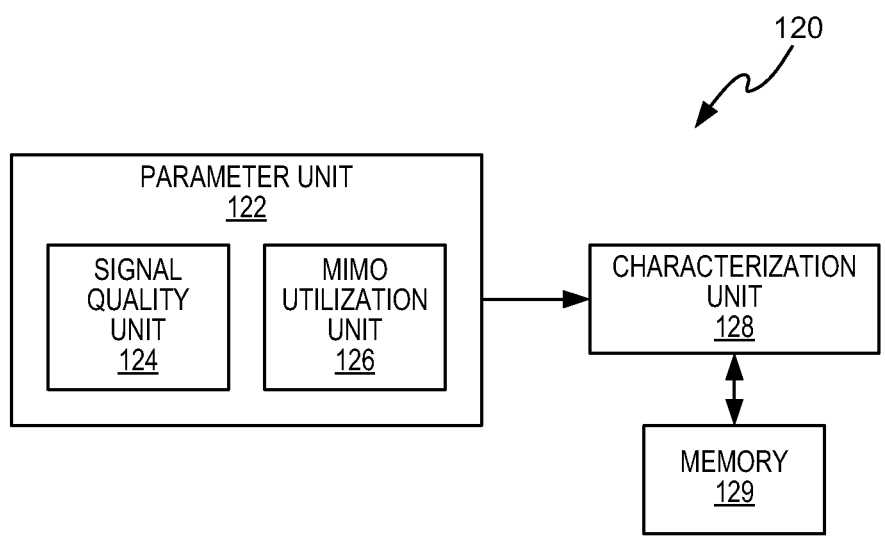
FIG. 11 shows a block diagram of a noise processor according to an exemplary embodiment.

FIG. 10 shows an exemplary method 1000 for determining whether multiplicative noise limits throughput conditions as executed by a noise processor 120 comprising a parameter unit 122 and a characterization unit 128, as shown in FIG. 11. It will be appreciated that the noise processor 120 may be part of the transmitter node 100, the receiver node 200, or another node within the wireless network.

Parameter unit 122 evaluates the throughput conditions based on a signal quality parameter and/or a MIMO utilization parameter (block 1010). Characterization unit 128 generates a multiplicative noise evaluation $R_{N_\pi}$ characterizing the MIMO throughput conditions based on the evaluated throughput conditions (block 1020). In some embodiments, the multiplicative noise evaluation may comprise qualitative information, e.g., a simple "yes" or "no" indication. In other embodiments, the multiplicative noise evaluation may comprise quantitative information providing a qualitative assessment of the multiplicative noise, e.g., how much the multiplicative noise dominates the additive noise.

In yet another embodiment, the parameter unit 122 may evaluate the throughput conditions based on a comparison between the reported indicators derived from precoded and non-precoded CSI-RSs. For example, in Release 11 of the LTE standard, it will be possible for the network to configure the receiver node 200 to report PMI, RI, and CQI based on more than one CSI-RS resource. As a result, it is possible to configure the receiver node 200 to report on both the precoded and a non-precoded CSI-RSs. By comparing the reported indicators it is possible for the transmitter node 100 to both determine if multiplicative noise still limits the throughput conditions. A similar result in a context of Release 10 of the LTE standard may be achieved by periodically transmitting non-precoded CSI-RSs and comparing the resulting reported indicators with the reported indicators based on the precoded CSI-RSs. This comparison may be used as exit criterion for the multiplicative nose-override procedures.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of improving throughput conditions in a wireless communication network for a wireless multiple-input, multiple-output (MIMO) channel between a MIMO transmitter comprising an antenna array having a plurality of antennas and a MIMO receiver, the method comprising:
   determining that multiplicative noise limits the throughput conditions when the multiplicative noise is stronger than additive noise, said additive noise comprising at least one of a thermal noise and an interference at one or both of the MIMO transmitter and the MIMO receiver, and said multiplicative noise comprising any noise dependent on or proportional to a signal strength at one or both of the MIMO transmitter and the MIMO receiver;
   identifying a dominant signal path between the MIMO transmitter and the MIMO receiver; and
   determining a set of precoder weights for each of one or more data streams communicated between the MIMO transmitter and the MIMO receiver based on information derived from non-precoded feedback reference symbols to decrease the transmission power allocated to one or more of the data streams associated with the dominant signal path relative to the transmission power allocated to one or more of the data streams associated with a non-dominant signal path.

2. The method of claim 1 further comprising:
   receiving the non-precoded feedback reference symbols at the MIMO receiver; and
   determining the information based on the received non-precoded feedback reference symbols;
   wherein determining the set of precoder weights for the data streams comprises selecting the set of precoder weights for each of the one or more data streams based on the determined information, and forwarding the selected sets of precoder weights to the MIMO transmitter.

3. The method of claim 2 wherein selecting the set of precoder weights for the data streams comprises selecting the set of precoder weights for each of the one or more data streams from a predetermined codebook of precoder weights known to the MIMO transmitter and receiver based on the determined information.

4. The method of claim 1 wherein determining the set of precoder weights for the data streams comprises receiving selected sets of precoder weights from the MIMO receiver, said selected sets selected by the MIMO receiver based on the information derived from the non-precoded feedback reference symbols, and determining the set of precoder weights for each of the one or more data streams based on the received selected sets of precoder weights.

5. The method of claim 1 further comprising receiving a first pre-coding matrix index (PMI) from the MIMO receiver, said first PMI derived from the non-precoded feedback reference symbols, wherein selecting the set of precoder weights for the data streams comprises selecting the set of precoder weights for each of the one or more data streams based on the first PMI.

6. The method of claim 5 further comprising receiving a second PMI from the MIMO receiver, said second PMI derived from precoded feedback reference symbols, wherein selecting the set of precoder weights for the data streams comprises selecting the set of precoder weights for each of the one or more data streams based on the first PMI and the second PMI.

7. The method of claim 6 further comprising:
   selecting a set of reference precoder weights based on the first PMI;
   weighting one or more feedback reference symbols using the selected set of reference precoder weights to generate the precoded feedback reference symbols; and transmitting the precoded feedback reference symbols to the MIMO receiver.

8. The method of claim 7 further comprising:
receiving at least one of a rank indicator and a channel quality indicator from the MIMO receiver, said rank indicator and channel quality indicator both derived based on channel estimates derived from the precoded feedback reference symbols; and
determining at least one of a transmission rank and a modulation and coding scheme based on at least one of the received rank indicator and the channel quality indicator.

9. The method of claim 1 further comprising determining at least one of a first transmission rank and a first modulation and coding scheme based on feedback received from the MIMO receiver.

10. The method of claim 9 further comprising increasing the determined first transmission rank based on the determined set of precoder weights.

11. The method of claim 1 wherein the dominant signal path comprises a line of sight signal path between the MIMO transmitter and the MIMO receiver.

12. The method of claim 1 further comprising receiving dominant signal path information from one of a remote communication node and the MIMO receiver, and identifying the dominant signal path between the MIMO transmitter and the MIMO receiver based on the received dominant signal path information.

13. The method of claim 12 wherein receiving the dominant signal path information comprises receiving a pre-coding matrix index (PMI) and a rank indicator indicating a rank of one or two, and wherein identifying the dominant signal path comprises identifying the dominant signal path between the MIMO transmitter and the MIMO receiver based on the received PMI.

14. The method of claim 1 further comprising receiving a multiplicative noise evaluation at the MIMO communication node from a remote reporting node, wherein determining that multiplicative noise limits the throughput conditions comprises determining that multiplicative noise limits the throughput conditions based on the received multiplicative noise evaluation.

15. The method of claim 1 wherein determining that multiplicative noise limits the throughput conditions comprises:
evaluating at least one of a MIMO operating parameter and a signal quality parameter associated with signals communicated between the MIMO transmitter and the MIMO receiver; and
determining that multiplicative noise limits the throughput conditions based on at least one of the MIMO operating parameter and the signal quality parameter.

16. The method of claim 1 further comprising storing past multiplicative noise observations associated with at least one of the MIMO transmitter, the MIMO receiver, and a cell in the wireless communication network, wherein determining that multiplicative noise limits the throughput conditions comprises determining that multiplicative noise limits the throughput conditions based on the past multiplicative noise observations.

17. The method of claim 1 wherein determining the set of precoder weights comprises determining the set of precoder weights according to a singular value decomposition.

18. A multiple-input, multiple output (MIMO) node in a wireless communication network, the MIMO node comprising:
a noise processor configured to determine that multiplicative noise limits the throughput conditions when the multiplicative noise is stronger than additive noise, said additive noise comprising at least one of a thermal noise and an interference at one or both of the MIMO transmitter and the MIMO receiver, and said multiplicative noise comprising any noise dependent on or proportional to a signal strength at one or both of the MIMO node and a remote MIMO node;
a path unit configured to identify a dominant signal path between the MIMO node and the remote MIMO node; and
a weight unit configured to determine a set of precoder weights for each of one or more data streams communicated between the MIMO node and the remote MIMO node based on information derived from non-precoded feedback reference symbols to decrease the transmission power allocated to one or more of the data streams associated with the dominant signal path relative to the transmission power allocated to one or more of the data streams associated with a non-dominant signal path.

19. The MIMO node of claim 18 further comprising:
a transceiver unit configured to receive the non-precoded feedback reference symbols; and
a channel estimator configured to determine the information based on the received non-precoded feedback reference symbols;
wherein the weight unit determines the set of precoder weights for the data streams by selecting the set of precoder weights for each of the one or more data streams based on determined information, and
wherein the transceiver is configured to forward the selected sets of precoder weights to the remote MIMO node.

20. The MIMO node of claim 19 further comprising:
a memory configured to store a predetermined codebook of precoder weights known to the MIMO node and the remote MIMO node,
wherein the weight unit selects the set of precoder weights for the data streams by selecting the set of precoder weights for each of the one or more data streams from the codebook.

21. The MIMO node of claim 18 further comprising:
a transceiver configured to receive selected sets of precoder weights from the remote MIMO node, said selected sets selected by the remote MIMO node based on the information derived from the non-precoded feedback reference symbols,
wherein the weight unit determines the set of precoder weights for each of the one or more data streams based on the received selected sets of precoder weights.

22. The MIMO node of claim 18 further comprising:
a transceiver configured to receive a first pre-coding matrix index (PMI) from the remote MIMO node, said first PMI derived by the remote MIMO node based on the information derived from non-precoded feedback reference symbols,
wherein the weight unit selects the set of precoder weights for the data streams by selecting the set of precoder weights for each of the one or more data streams based on the first PMI.

23. The MIMO node of claim 22 further comprising:
a transceiver configured to receive a second PMI from the remote MIMO node, said second PMI derived at the remote MIMO node based on information derived from precoded feedback reference symbols,
wherein the weight unit selects the set of precoder weights for the data streams by selecting the set of precoder weights for each of the one or more data streams based on the first PMI and the second PMI.

24. The MIMO node of claim 23 wherein the weight unit is further configured to select a set of reference precoder weights based on the first PMI and weight one or more feedback reference symbols using the selected set of reference precoder weights to generate the precoded feedback reference symbols, and wherein the transceiver is further configured to transmit the precoded feedback reference symbols to the remote MIMO node.

25. The MIMO node of claim 24 wherein the transceiver is further configured to receive at least one of a rank indicator and a channel quality indicator from the remote MIMO node, said rank indicator and channel quality indicator both derived based on channel estimates derived from the precoded feedback reference symbols, the MIMO node further comprising a selection unit configured to determine at least one of a transmission rank and a modulation and coding scheme based on at least one of the received rank indicator and the channel quality indicator.

26. The MIMO node of claim 18 further comprising a selection unit configured to determine at least one of a first transmission rank and a first modulation and coding scheme based on feedback received from the remote MIMO node.

27. The MIMO node of claim 26 wherein the selection unit is further configured to increase the determined first transmission rank based on the determined set of precoder weights.

28. The MIMO node of claim 18 wherein the dominant signal path comprises a line of sight signal path between the MIMO node and the remote MIMO node.

29. The MIMO node of claim 18 further comprising:
a transceiver configured to receive dominant signal path information from the remote MIMO node; and
a path unit configured to identify the dominant signal path between the MIMO node and the remote MIMO node based on the received dominant signal path information.

30. The MIMO node of claim 18 further comprising a transceiver configured to receive a pre-coding matrix index (PMI) and a rank indicator indicating a rank of one or two from the remote MIMO node, wherein the path unit identifies the dominant signal path by identifying the dominant signal path between the MIMO node and the remote MIMO node based on the received PMI.

31. The MIMO node of claim 18 further comprising a transceiver configured to receive a multiplicative noise evaluation from a remote reporting node, wherein the noise processor determines that multiplicative noise limits the throughput conditions based on the received multiplicative noise evaluation.

32. The MIMO node of claim 18 wherein the noise processor comprises:
a parameter unit configured to evaluate at least one of a MIMO operating parameter and a signal quality parameter associated with signals communicated between the MIMO node and the remote MIMO node; and
a characterization unit configured to determine that multiplicative noise limits the throughput conditions based on at least one of the MIMO operating parameter and the signal quality parameter.

33. The MIMO node of claim 32 further comprising a memory configured to store past multiplicative noise observations associated with at least one of the MIMO node and a cell in the wireless communication network, wherein the characterization unit determines that multiplicative noise limits the throughput conditions based on the past multiplicative noise observations.

34. The MIMO node of claim 18 wherein the MIMO node comprises one of a pico site, a radio base station, an access point, a relay, a wireless backhaul node, and a user equipment.

35. The MIMO node of claim 18 wherein the weight unit determines the set of precoder weights according to a singular value decomposition.

* * * * *